Patented Oct. 4, 1932

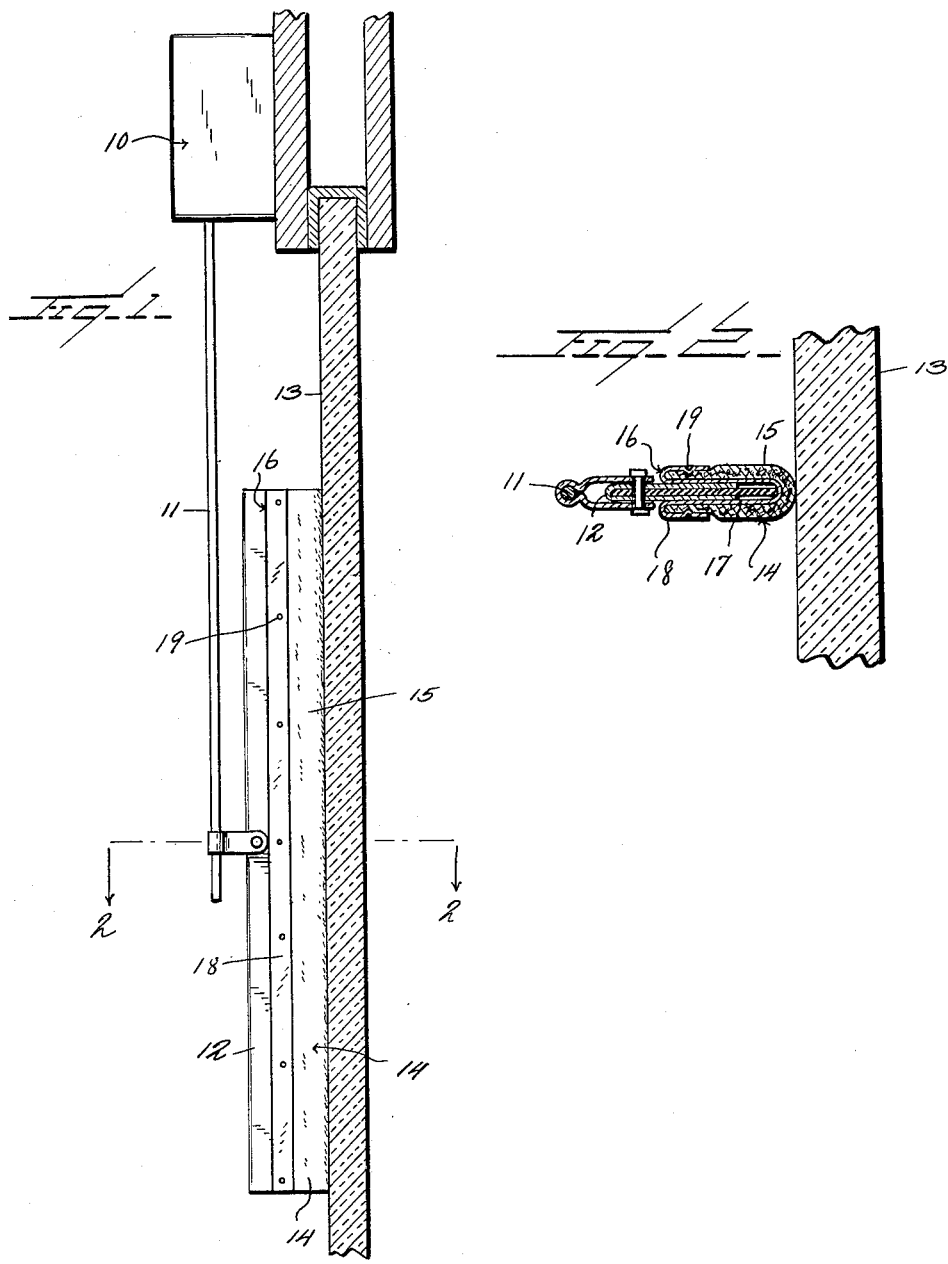

1,881,182

UNITED STATES PATENT OFFICE

OLIVER P. GREENSTREET, OF OWENSVILLE, MISSOURI

WINDSHIELD WIPER

Application filed October 18, 1930. Serial No. 489,676.

The present invention relates to window wiping devices and more particularly to an attachment for a window wiper for preventing the accumulation of ice on the windshield.

An object of this invention is to provide a device of this character which may be readily attached or mounted on a conventional windshield wiper of either the mechanical or manual type which is adapted to moisten the outer surface of the windshield during the movement of the wiper.

Another object of this invention is to provide an absorbent attachment which is adapted to be moistened with a non-freezing fluid for wiping the windshield with the fluid upon movement of the wiper so as to prevent accumulation of ice or the like upon the windshield.

A still further object of this invention is to provide a device of this kind which is so constructed as not to interfere with the present parts of the windshield wiper and which may be readily attached or detached for remoistening of the element so as to maintain a constant film of non-freezing liquid or fluid on the outer face of the windshield.

The above and various other objects and advantages of this invention will in part be described in and in part be understood from the following detailed description of the present preferred embodiment, the same being illustrated in the accompanying drawing, wherein:—

Figure 1 is a detail side elevation of a device constructed according to the preferred embodiment of this invention mounted on a conventional windshield wiper;

Figure 2 is a sectional view taken on the line 2—2 of Figure 1.

Referring to the drawing wherein like numerals of reference designate corresponding parts throughout the several views, the numeral 110 designates generally a windshield wiper motor of any desired type which is provided with a rockable arm 11 on the lower end of which is mounted a windshield wiping member 12. The windshield wiper 12 is adapted to be oscillated or rocked across the outer surface of the windshield 13 which is mounted on a vehicle or the like.

In freezing temperatures, the windshield wiper 12 is retarded in its swinging or oscillating movement by reason of the accumulation of ice on the outer surface of the windshield 13 and in order to permit the wiper 12 to freely oscillate on the outer surface of the windshield 13 and so as to prevent the accumulation of any ice within the path of the wiper 12, I have provided an attachment generally designated as 14, which comprises an elongated absorbent member 15 which is constructed preferably of felt or the like, and which is adapted to be saturated with an anti-freezing fluid.

The fabric member 15 is secured to the wiper 12 by means of a metal clamping body 16 which comprises a U-shaped portion 17 engaging about the opposite sides of the wiper 12, the U-shaped body 17 being provided at the free ends thereof with reverted portions 18 which engage the free ends of the fabric 15 and clamp the fabric 15 on the metal clamping member 16. The clamping arms 18 may be suitably indented, as at 19, so as to more firmly hold the fabric 15 on the clamping member 16.

The clamping member 16 is of such construction as to be readily attached or detached from the wiper 12 and is of such resiliency that when mounted on the wiper 12, it will hold the fabric 18 thereon against longitudinal movement. In the use of this device, the absorbent body 14 is adapted to be dipped into a liquid of anti-freezing composition and while in moistened condition placed on the wiper 12. The motor 10 may be then operated in the conventional manner or if desired, the wiper arm 11 may be secured to a manually operated wiper.

The quantity of liquid absorbed by the fabric 15 is such as to permit the use of the wiper for a considerable length of time, but when the wiper becomes substantially dry it may be readily removed from the wiper 12 and again dipped into the anti-freezing liquid and replaced for further operation.

It will be obvious from the foregoing that a relatively simple and at the same time practical device has been constructed which is adapted to be used with any conventional windshield wiper and the device is so constructed as not to interfere in any way with the normal operation of the wiper parts.

It is, of course, understood that various changes and modifications may be made in the details of construction and design of the above specifically described embodiment of this invention without departing from the spirit thereof, such changes and modifications being restricted only by the scope of the following claim.

I claim:—

A windshield wiping element comprising a U-shaped resilient clamping member for clamping therein a windshield wiper blade, an absorbent wiping member engaging about the outer surface of said clamping member, and reverted securing means formed with each leg of said clamping member for securing said wiping member on said clamping member.

In testimony whereof I hereunto affix my signature.

OLIVER P. GREENSTREET.